(12) United States Patent
Gargiulo

(10) Patent No.: US 9,767,287 B2
(45) Date of Patent: Sep. 19, 2017

(54) SYSTEMS, METHODS, AND COMPUTER PROGRAM PRODUCTS FOR MANAGING DATA RE-INSTALLATION

(71) Applicant: GOOGLE INC., Mountain View, CA (US)

(72) Inventor: Michael J. Gargiulo, Corinth, TX (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/160,062

(22) Filed: Jan. 21, 2014

(65) Prior Publication Data
US 2014/0215639 A1    Jul. 31, 2014

Related U.S. Application Data

(60) Provisional application No. 61/825,857, filed on May 21, 2013, provisional application No. 61/756,853, filed on Jan. 25, 2013.

(51) Int. Cl.
*G06F 21/10*      (2013.01)
*G06F 21/57*      (2013.01)
(Continued)

(52) U.S. Cl.
CPC .......... *G06F 21/57* (2013.01); *G06Q 20/3229* (2013.01); *G06Q 20/3552* (2013.01); *H04W 4/001* (2013.01); *H04W 12/04* (2013.01)

(58) Field of Classification Search
CPC ..... H04M 1/72525; H04W 4/00; H04W 4/14; H04W 24/00; H04W 4/06; H04W 4/003;
(Continued)

(56) References Cited

U.S. PATENT DOCUMENTS 5,590,038 A    12/1996    Pitroda .................... 395/241
5,640,002 A     6/1997    Ruppert et al. ........... 235/472
(Continued)

FOREIGN PATENT DOCUMENTS

CA    2 381 614 A1    3/2001
CN    101122864 A     2/2008
(Continued)

OTHER PUBLICATIONS

Int'l Search Report and Written Opinion issued in connection with Int'l Appl'n No. PCT/US2014/012339 on May 30, 2014 (8 pages).
(Continued)

*Primary Examiner* — Ali Abyaneh
(74) *Attorney, Agent, or Firm* — Johnson, Marcou & Isaacs, LLC

(57) ABSTRACT

Systems, methods, and computer program products are provided for managing data re-installation including service re-installation. A re-installation procedure re-installs and optionally activates data at least partially installed on a secure element without intervention middleware to repair a personalization procedure failure. Thus, personalization data on a secure element (SE) may be comprehensively managed by interfacing between one of a plurality of service provider (SP) trusted service managers (TSM) and a central trusted service manager (central TSM). The processing time required to manage the re-installation procedure is minimized.

29 Claims, 5 Drawing Sheets

(51) Int. Cl.
*G06Q 20/32* (2012.01)
*G06Q 20/34* (2012.01)
*H04W 12/04* (2009.01)
*H04W 4/00* (2009.01)

(58) Field of Classification Search
CPC .......... G06F 8/60; G06F 21/606; G06F 21/10;
G06F 21/31; G06F 21/51; G06F 21/64;
G06F 21/72; G06F 21/1408; G06F 8/61;
G06F 8/65; H04L 63/0428
USPC ................. 726/28; 716/28; 455/403
See application file for complete search history.

(56) References Cited

U.S. PATENT DOCUMENTS

| | | | |
|---|---|---|---|
| 5,748,740 A | 5/1998 | Curry et al. | 380/25 |
| 5,805,702 A | 9/1998 | Curry et al. | 380/24 |
| 5,884,271 A | 3/1999 | Pitroda | 705/1 |
| 5,901,303 A | 5/1999 | Chew | 395/400 |
| 5,940,510 A | 8/1999 | Curry et al. | 380/25 |
| 5,949,880 A | 9/1999 | Curry et al. | 380/24 |
| 6,073,840 A | 6/2000 | Marion | 235/381 |
| 6,105,013 A | 8/2000 | Curry et al. | 705/65 |
| 6,116,505 A | 9/2000 | Withrow | 235/381 |
| 6,131,811 A | 10/2000 | Gangi | 235/380 |
| 6,237,095 B1 | 5/2001 | Curry et al. | 713/178 |
| 6,422,464 B1 | 7/2002 | Terranova | 235/384 |
| 6,587,835 B1 | 7/2003 | Treyz et al. | 705/14 |
| 6,601,759 B2 | 8/2003 | Fife et al. | 235/375 |
| 6,671,358 B1 | 12/2003 | Seidman et al. | 379/93.12 |
| 6,732,081 B2 | 5/2004 | Nicholson | 705/14 |
| 6,769,607 B1 | 8/2004 | Pitroda et al. | 235/380 |
| 6,813,609 B2 | 11/2004 | Wilson | 705/14 |
| 6,837,436 B2 | 1/2005 | Swartz et al. | 235/472.02 |
| 6,925,439 B1 | 8/2005 | Pitroda | 705/1 |
| 7,083,094 B2 | 8/2006 | Cooper | 235/449 |
| 7,110,792 B2 | 9/2006 | Rosenberg | 455/558 |
| 7,127,236 B2 | 10/2006 | Khan et al. | 455/414.1 |
| 7,155,405 B2 | 12/2006 | Petrovich | 705/26 |
| 7,194,422 B1 | 3/2007 | Killick | 705/14 |
| 7,216,109 B1 | 5/2007 | Donner | 705/64 |
| 7,249,112 B2 | 7/2007 | Berardi et al. | 705/79 |
| 7,286,818 B2 | 10/2007 | Rosenberg | 455/414.1 |
| 7,298,271 B2 | 11/2007 | Sprogis | 340/572.1 |
| 7,308,426 B1 | 12/2007 | Pitroda | 705/35 |
| 7,330,714 B2 | 2/2008 | Rosenberg | 455/412.1 |
| 7,349,885 B2 | 3/2008 | Gangi | 705/41 |
| 7,469,151 B2 | 12/2008 | Khan et al. | 455/558 |
| 7,469,381 B2 | 12/2008 | Ording | 715/702 |
| 7,483,858 B2 | 1/2009 | Foran et al. | 705/39 |
| 7,494,055 B2 | 2/2009 | Fernandes et al. | 235/380 |
| 7,529,563 B1 | 5/2009 | Pitroda | 455/558 |
| 7,571,139 B1 | 8/2009 | Giordano et al. | 705/40 |
| 7,581,678 B2 | 9/2009 | Narendra et al. | 235/451 |
| 7,613,628 B2 | 11/2009 | Ariff et al. | 705/14 |
| 7,631,810 B2 | 12/2009 | Liu et al. | 235/451 |
| 7,693,752 B2 | 4/2010 | Jaramillo | 705/26 |
| 7,708,198 B2 | 5/2010 | Gangi | 235/380 |
| 7,712,658 B2 | 5/2010 | Gangi | 235/380 |
| 7,775,430 B2 | 8/2010 | Lin | 235/383 |
| 7,805,615 B2 | 9/2010 | Narendra et al. | 713/186 |
| 7,828,214 B2 | 11/2010 | Narendra et al. | 235/451 |
| 7,856,377 B2 | 12/2010 | Cohagan et al. | 705/14.3 |
| 7,864,163 B2 | 1/2011 | Ording et al. | 345/173 |
| 7,934,210 B1* | 4/2011 | Stampfli et al. | 717/168 |
| 7,942,337 B2 | 5/2011 | Jain | 235/492 |
| 7,954,715 B2 | 6/2011 | Narendra et al. | 235/451 |
| 7,954,716 B2 | 6/2011 | Narendra et al. | 235/451 |
| 7,954,717 B2 | 6/2011 | Narendra et al. | 235/451 |
| 7,961,101 B2 | 6/2011 | Narendra et al. | 340/572.1 |
| 7,967,215 B2 | 6/2011 | Kumar et al. | 235/492 |
| 7,991,158 B2 | 8/2011 | Narendra et al. | 380/260 |
| 8,072,331 B2 | 12/2011 | Narendra et al. | 340/572.1 |
| 8,083,145 B2 | 12/2011 | Narendra et al. | 235/451 |
| 8,091,786 B2 | 1/2012 | Narendra et al. | 235/451 |
| 8,107,945 B2* | 1/2012 | Hoffner et al. | 455/419 |
| 8,131,645 B2 | 3/2012 | Lin et al. | 705/51 |
| 8,140,418 B1 | 3/2012 | Casey et al. | 705/35 |
| 8,171,525 B1 | 5/2012 | Pelly et al. | |
| 8,396,808 B2 | 3/2013 | Greenspan | 705/64 |
| 8,429,046 B2 | 4/2013 | Pitroda | 705/35 |
| 8,532,572 B2* | 9/2013 | Renard | G06Q 20/32 455/41.1 |
| 8,707,291 B2* | 4/2014 | Hale et al. | 717/172 |
| 8,875,228 B2 | 10/2014 | Gargiulo et al. | 726/1 |
| 2002/0049631 A1 | 4/2002 | Williams | 705/14 |
| 2002/0082921 A1 | 6/2002 | Rankin | 705/14 |
| 2002/0089543 A1 | 7/2002 | Ostergaard et al. | 345/764 |
| 2002/0174025 A1 | 11/2002 | Hind et al. | 705/26 |
| 2002/0179703 A1 | 12/2002 | Allen | 235/381 |
| 2003/0009382 A1 | 1/2003 | D'Arbeloff et al. | 705/17 |
| 2003/0083042 A1 | 5/2003 | Abuhamdeh | 455/406 |
| 2003/0115126 A1 | 6/2003 | Pitroda | 705/36 |
| 2003/0132298 A1 | 7/2003 | Swartz et al. | 235/472.02 |
| 2003/0200489 A1 | 10/2003 | Hars | 714/703 |
| 2004/0073519 A1 | 4/2004 | Fast | 705/65 |
| 2004/0186768 A1 | 9/2004 | Wakim et al. | 705/14 |
| 2005/0004866 A1 | 1/2005 | Bonalle et al. | 705/39 |
| 2005/0171898 A1 | 8/2005 | Bishop et al. | 705/39 |
| 2005/0222961 A1 | 10/2005 | Staib et al. | 705/64 |
| 2005/0234769 A1 | 10/2005 | Jain et al. | 705/14 |
| 2005/0247777 A1 | 11/2005 | Pitroda | 235/380 |
| 2006/0287004 A1 | 12/2006 | Fuqua | 455/558 |
| 2007/0014407 A1 | 1/2007 | Narendra et al. | 380/259 |
| 2007/0014408 A1 | 1/2007 | Narendra et al. | 380/270 |
| 2007/0198432 A1 | 8/2007 | Pitroda et al. | 705/64 |
| 2008/0306849 A1 | 12/2008 | Johnson, Jr. et al. | 705/35 |
| 2009/0108064 A1 | 4/2009 | Fernandes et al. | 235/380 |
| 2009/0125755 A1 | 5/2009 | Herscovitz et al. | 714/15 |
| 2009/0164322 A1 | 6/2009 | Khan et al. | 705/14 |
| 2010/0115576 A1 | 5/2010 | Hale et al. | |
| 2010/0241494 A1 | 9/2010 | Kumar et al. | 705/14.1 |
| 2010/0248707 A1 | 9/2010 | Hoffner et al. | |
| 2010/0291904 A1* | 11/2010 | Musfeldt et al. | 455/414.1 |
| 2011/0073663 A1 | 3/2011 | Narendra et al. | 235/492 |
| 2011/0171996 A1 | 7/2011 | Narendra et al. | 455/558 |
| 2011/0223972 A1 | 9/2011 | Narendra et al. | 455/558 |
| 2011/0231238 A1 | 9/2011 | Khan et al. | 705/14.26 |
| 2011/0244796 A1 | 10/2011 | Khan et al. | 455/41.1 |
| 2011/0269438 A1 | 11/2011 | Narendra et al. | 455/414.1 |
| 2011/0271044 A1 | 11/2011 | Narendra et al. | 711/103 |
| 2011/0272468 A1 | 11/2011 | Narendra et al. | 235/492 |
| 2011/0272469 A1 | 11/2011 | Narendra et al. | 235/492 |
| 2012/0064828 A1 | 3/2012 | Khan et al. | 455/41.1 |
| 2012/0102477 A1* | 4/2012 | Kim et al. | 717/169 |
| 2012/0109764 A1 | 5/2012 | Martin et al. | 705/17 |
| 2012/0190354 A1 | 7/2012 | Merrien et al. | 455/422.1 |
| 2012/0264400 A1 | 10/2012 | Khan et al. | 455/411 |
| 2012/0300932 A1 | 11/2012 | Cambridge et al. | |
| 2012/0323664 A1 | 12/2012 | Klems | 705/14.26 |
| 2013/0067032 A1* | 3/2013 | Kasim | 709/217 |
| 2013/0111599 A1 | 5/2013 | Gargiulo | 726/26 |
| 2013/0262302 A1 | 10/2013 | Lettow et al. | 705/41 |

FOREIGN PATENT DOCUMENTS

| | | |
|---|---|---|
| EP | 1 222 503 A2 | 7/2002 |
| EP | 0 766 852 B1 | 8/2004 |
| EP | 1 412 890 A4 | 11/2004 |
| EP | 1 477 943 A2 | 11/2004 |
| JP | 2003-256211 A | 9/2003 |
| JP | 2009-026011 A | 2/2009 |
| JP | 2009-146403 A | 7/2009 |
| JP | 2010-129054 A | 6/2010 |
| JP | 2010541059 A | 12/2010 |
| JP | 2011-066757 A | 3/2011 |
| KR | 1020100128948 A | 12/2010 |
| TW | 201121257 A1 | 6/2011 |
| WO | WO 01/18629 A3 | 3/2001 |
| WO | WO 03/012717 A1 | 2/2003 |

(56) References Cited

FOREIGN PATENT DOCUMENTS

| | | |
|---|---|---|
| WO | 2011/141185 A1 | 11/2011 |
| WO | 2014/116589 A1 | 7/2014 |

OTHER PUBLICATIONS

"GlobalPlatform—Card Specification," Mar. 2003, GlobalPlatform Inc., pp. 1-237, version 2.1.1.

"GlobalPlatform—Card Specification," Mar. 2006, GlobalPlatform Inc., pp. 1-355, version 2.2.

"GlobalPlatform—Card Specification," Jan. 2011, GlobalPlatform Inc., pp. 1-283, version 2.2.1.

International Preliminary Report on Patentability and Written Opinion Received for PCT Patent Application No. PCT/US2014/012339, mailed on Aug. 6, 2015, 10 pages.

Moon, "KR Office Action issued in Korean Application No. 1020147036494", Feb. 19, 2016, 1-9.

Frank, "Extended European Search Report issued in European Application No. 14743575.4", mailed on Jan. 19, 2016, 6 pages.

Sandler, "Office Action received for Canada Patent Application No. 2874729", mailed on Feb. 15, 2016, 4 pages.

Tago, "Japanese Office Action issued in Japanese Application No. 2015-524515", mailed on Mar. 18, 2016, 4 pages of English Translation and 4 pages of Japanese Office Action.

Moon, "Korean Office Action issued in Korean Application No. 10-2014-7036494", mailed on Oct. 19, 2016, 4 pages of English Translation and 4 pages of Korean Office Action.

Unknown, "Office Action issued in Chinese Application No. 201480001656.3", mailed on Oct. 31, 2016, 10 pages of Chinese Office Action only.

Sandler, "Office Action received for Canada Patent Application No. 2874729", dated Dec. 16, 2016, 3 pages.

Li, "Office Action issued in Chinese Application No. 201480001656.3" dated Oct. 31, 2016, 11 pages of English Translation and 10 pages of Chinese Office Action.

Hector, "Mexican Office Action issued in Mexican Application No. MX/a/2014/015510", dated Feb. 1, 2017, 2 pages of English Translation and 2 pages of Mexican Office Action only.

Frank, "European Office Action issued in European Application No. 14743575.4", dated Mar. 1, 2017, 6 pages.

Li, "Chinese Office Action issued in Chinese Application No. 201480001656.3", dated on May 31, 2017, 15 pages of English Translation and 11 pages of Chinese Office Action.

\* cited by examiner

SYSTEMS, METHODS, AND COMPUTER PROGRAM PRODUCTS FOR MANAGING DATA RE-INSTALLATION

CROSS REFERENCE TO RELATED APPLICATION

This application claims priority to U.S. Provisional Application No. 61/825,857, filed May 21, 2013, and 61/756,853, filed Jan. 25, 2013, the contents of which are incorporated herein by reference.

BACKGROUND

Field

The present invention relates to mobile networks, and more particularly to systems, methods, and computer program products for managing data re-installation including service re-installation.

Related Art

A service provider (SP) is a company, organization, entity, or the like, that provides services to customers or consumers. Examples of service providers include account-issuing entities such as merchants, card associations, banks, marketing companies, and transit authorities. A service may be an activity, capability, functionality, work, or use that is permitted or provided by a service provider such as a payment service, a ticketing service, a gift, offer or loyalty service, a transit pass service, and the like. A service may include one or more applets as well as data (e.g., credentials) associated with each of the applets.

In a mobile environment that involves contactless transactions between a mobile device and a service provider, information relating to the accounts and applets issued by the service providers is downloaded onto mobile devices in order to enable them to perform the contactless transactions.

A trusted service manager (TSM) is typically an independent entity serving mobile network operators (MNOs) and account-issuing service providers by provisioning applets, such as contactless applets associated with the service providers, to mobile devices. Typical TSMs can distribute and manage the contactless applets remotely because they have access to secure elements (SEs) in a near field communication (NFC) enabled mobile device.

Security-critical applets, such as those involving payment and account credentials, require secure hardware storage and a secure execution environment. On mobile devices, this is usually handled by the secure element.

The secure element is a platform onto which applets can be installed, personalized and managed. It consists of hardware, software, interfaces, and protocols that enable the secure storage of data such as credentials, and execution of applets for payment, authentication, and other services. An applet may correspond to a service (e.g., payment, commerce, ticketing) offered by a service provider.

A secure element may be implemented in different form factors such as a Universal Integrated Circuit Card (UICC), an embedded secure element, or NFC enablers such as a separate chip or secure device, which can be inserted into a slot on the mobile device. Typically a UICC is in the form of a subscriber identity module (SIM), which is controlled by the MNOs. An embedded secure element gives service providers the option to embed the secure element into the phone itself. One way in which secure element form factors are implemented is defined in, for example, GlobalPlatform Card Specification Versions 2.1.1, 2.2, and 2.2.1 (hereinafter "Global Platform").

A secure element may include one or more security domains (SDs), each of which includes a collection of data, such as packages, applets, and the like, that trust a common entity (e.g., are authenticated or managed by using a common security key or token).

Security domains may be associated with service providers and may include service provider applets such as loyalty, couponing, and credit card, and transit applets.

A central TSM is a system for interfacing (e.g., communicating, beginning a dialog) service providers and secure elements, for example for service providers to personalize services on a secure element, transmit scripts to be processed, and the like. An exemplary embodiment of a central TSM for managing communications between service providers and secure elements is described in more detail in U.S. patent application Ser. No. 13/653,160 entitled "Systems, Methods, and Computer Program Products for Interfacing Multiple Service Provider Trusted Service Managers and Secure Elements," which is hereby incorporated by reference in its entirety.

Traditionally, when a SP attempts to personalize a service on a secure element, and during that personalization the procedure fails (e.g., due to a communication error or a dropped connection), the SP would have to manage and execute multiple new individual processes outside of that initial personalization procedure to, for example, clean up (e.g., delete) the partially personalized service and perform a recovery attempt to personalize the service. That is, traditionally the SP executes several steps that require intervention of the SP's middleware and the end-user or customer of the service to repair the personalization procedure failure. This is a time consuming and complex procedure, which requires extensive processing, coordinating, and use of resources.

One technical challenge involves centralizing a procedure within a TSM to re-install a partially personalized service without the intervention of the middleware of a SP.

Another technical challenge involves re-installing a service in accordance with requirements of the service (e.g., a service having security-critical data).

BRIEF DESCRIPTION

The present invention provides systems, methods, and computer program products for managing data re-installation including service re-installation.

In one embodiment, a system for managing data re-installation includes a processor coupled to a memory. The processor (e.g., included in a central trusted service manager, central TSM) receives, over a communications network (e.g., from a service provider trusted service manager, SP TSM), a re-install request to re-install data at least partially installed on a secure element. The data is re-installed on the secure element and activated (e.g., made usable or selectable).

In another embodiment, a method for managing data re-installation includes receiving, over a network, a re-install request to re-install data at least partially installed on a secure element, re-installing the data on the secure element, and activating the data re-installed on the secure element.

In another embodiment, a non-transitory computer-readable medium having stored thereon sequences of instructions, the sequences of instructions including instructions, which, when executed by a computer system cause the computer to: receive, over a network, a re-install request to re-install a data at least partially installed on a secure element; re-install the data on the secure element; and activate the data re-installed on the secure element.

In another embodiment, a system for managing service re-installation includes a processor coupled to a memory. The processor (e.g., included in a central TSM) receives, over a communications network (e.g., from a SP TSM), a re-installation request to re-install a service at least partially personalized on a secure element. The service is re-installed on the secure element and activated (e.g., made usable or selectable).

In another embodiment, a method for managing service re-installation includes receiving, over a network, a re-installation request to re-install a service at least partially personalized on a secure element, re-install the service on the secure element, and activating the service re-installed on the secure element.

In another embodiment, a non-transitory computer-readable medium having stored thereon sequences of instructions, the sequences of instructions including instructions, which, when executed by a computer cause the computer to: receive, over a network, a re-installation request to re-install a service at least partially personalized on a secure element; re-install the service on the secure element; and activate the service re-installed on the secure element.

BRIEF DESCRIPTION OF THE DRAWINGS

The features and advantages of the present invention will become more apparent from the detailed description set forth below when taken in conjunction with the following drawings.

DETAILED DESCRIPTION

Overview

Figure 1:
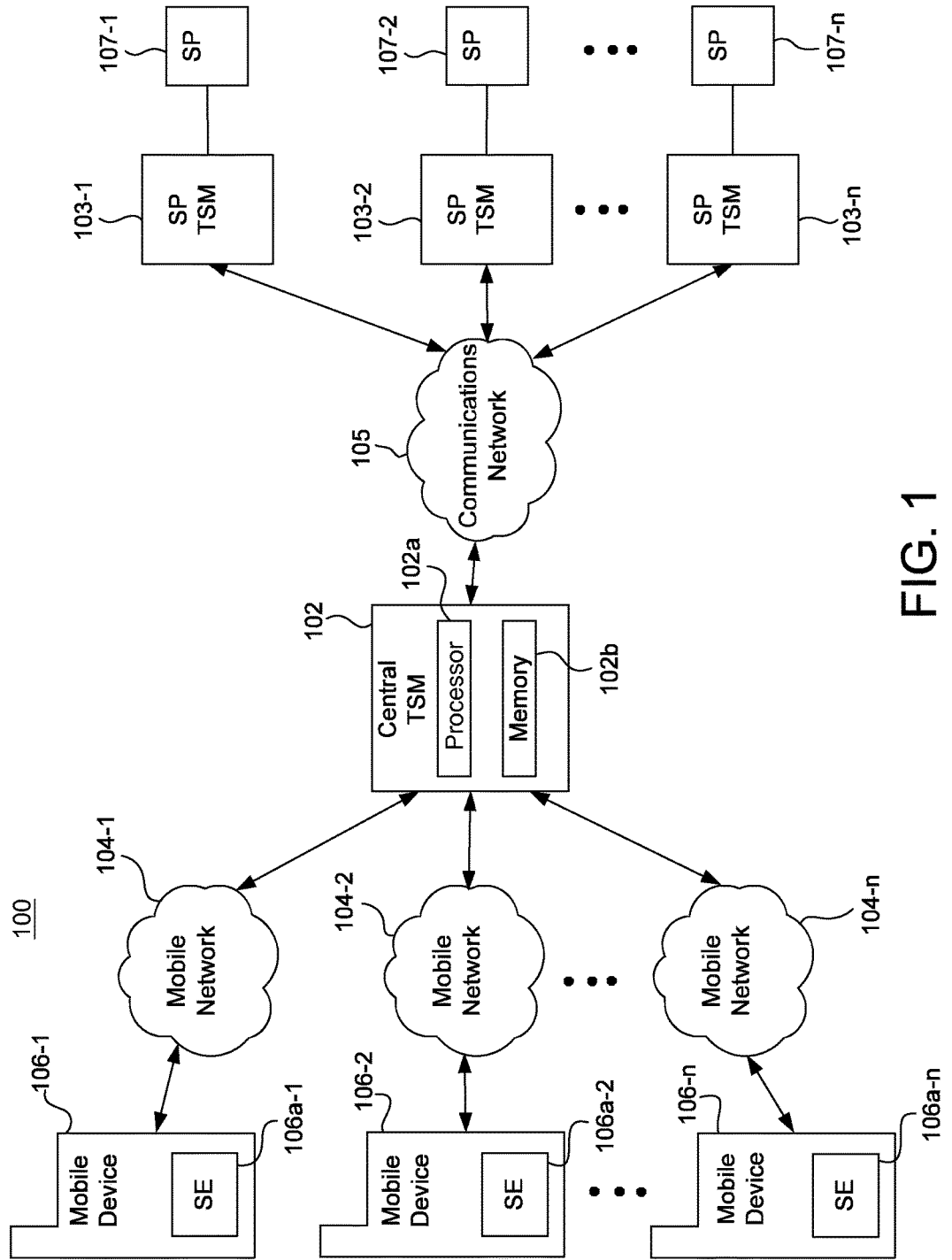
FIG. 1 is a diagram of a system for interfacing between service providers and mobile devices having secure elements according to an exemplary embodiment.

The example embodiments of the invention presented herein describe systems, methods, and computer program products for managing re-installation of partially personalized services in secure elements in communication with a TSM. This is for convenience only, and is not intended to limit the application of the present invention. In fact, after reading the following description, it will be apparent to one skilled in the relevant art(s) how to implement the following invention in alternative embodiments, such as in other system components (e.g., an enterprise service bus ("ESB")) capable of managing a re-installation request sent over a network to re-install a service having been partially personalized on a secure element or mobile device.

Generally, a service provider system (e.g., service provider) communicates with a central TSM in order to install services (e.g., one or more applets) on a secure element, install or personalize data on a secure element, re-install services at least partially personalized on the secure element, and/or activate data on the secure element.

It should be understood that "applets" as used herein refer to generic or instances of applets on a secure element.

The terms "applet," "application," and/or the plural form of these terms are used interchangeably herein to refer to an applet (functioning independently or in conjunction with other applets) or set or subset of instructions or code, which when executed by one or more processors (e.g., in a mobile device, card reader, terminal, point of sale (POS) system, or server) causes the processor(s) to perform specific tasks.

In one exemplary embodiment, the service provider may transmit a request to the central TSM to install a service (e.g., one or more applets) on a secure element. In response, the central TSM may install the service on the secure element, by generating at least one service provider security domain including corresponding temporary security keys, if required, and/or instantiating the service on the secure element.

Generally, service instantiation includes creating an instance of an uninstantiated applet on a secure element and extraditing that instance to a security domain on a secure element. Installing and/or instantiating a service on a secure element are described in more detail in U.S. patent application Ser. No. 13/653,145 entitled "Systems, Methods, and Computer Program Products for Managing Secure Elements," which is hereby incorporated by reference in its entirety.

In another exemplary embodiment, the service provider may transmit a request to the central TSM to personalize a service (e.g., an applet, multiple applets, or any other information to be associated with a service) on a secure element. In response, the central TSM may personalize the service by installing data (e.g., credentials) into that service.

In addition, the service provider may transmit a re-installation request to a single source (e.g., the central TSM) in the event that personalization of that service failed. The central TSM is able to manage the re-installation request to re-install a service on a secure element without the need to communicate with multiple intermediary sources (e.g., service provider middleware, end-user or customer of the service).

That is, a SP TSM calls an application programming interface (API) such as a web service API that exists on a central TSM. Via the API, the central TSM internally processes removal of a corrupted instance of a service, creates and installs a new instance of the service on the SE, and notifies the SP TSM that the new (e.g., clean) instance is available on the SE for a recovery attempt to personalize the service, without involving, for example, service provider middleware or the end-user or customer of the service.

As a result, the processing time required to execute the re-installation request is minimized relative to, for example, a system requiring involvement of the middleware of the SP.

System

FIG. 1 is a diagram of an exemplary system 100 for interfacing between service providers and secure elements over mobile networks. As shown in FIG. 1, system 100 includes SP TSMs 103-1, 103-2, . . . , 103-n (collectively "103"). Each of the SP TSMs 103 corresponds to a service provider 107-1, 107-2, . . . , 107-n (collectively "107"). Each SP TSM serves as an intermediary between the service providers 107 and other entities including secure elements, MNOs, and another type of TSM (referred to herein as a "central TSM").

Each of the SP TSMs 103 is communicatively coupled to central TSM 102 via a communications network 105. Communications network 105 may be a virtual private network (VPN), a network by using Hypertext Transfer Protocol (HTTP) standards, or the like.

Each of the SP TSMs 103 and the central TSM 102 may also secure these communications by using security protocols such as Secure Socket Layer (SSL), Transport Layer Security (TLS), or the like. Each of the SP TSMs 103 may also communicate with central TSM 102 by using an application programming interface (API) such as a web service API.

In an exemplary embodiment, the central TSM 102 is hardware and/or software that is implemented to serve as an intermediary between the SP TSMs 103 and secure elements 106a-1, 106a-2, . . . , 106a-n (collectively "106a"). Specifically, the central TSM 102 allows each of the SP TSMs 103 to, for example, request installation of data (e.g., a service) on a secure element (e.g., secure elements 106a), re-install data (e.g., re-install a service), generate and install new or temporary security domain keysets, and/or have data activated (e.g., made usable or selectable). That is, the central TSM 102 manages the communications between the SP TSMs 103 and the secure elements 106a.

The central TSM 102, therefore, can communicate with a plurality of service providers 107 and SP TSMs 103, and with a plurality of secure elements 106a over a plurality of mobile networks 104-1, 104-2, . . . , 104-n (collectively "104").

In an example embodiment, the central TSM 102 includes a processor 102a and a memory 102b.

The central TSM 102 is communicatively coupled to the secure elements 106a via corresponding mobile networks 104 that are used and/or managed by corresponding MNOs. Generally, the mobile networks 104 are used by MNOs to provide wireless communications services. The mobile networks 104 may be mobile phone cellular networks, radio networks, or the like. The central TSM 102 may communicate with the secure elements 106a, via the mobile networks 104, by using security protocols such as Global Platform secure channel protocol, SSL, TLS, or the like.

As shown in FIG. 1, secure elements 106a are associated with corresponding mobile devices 106-1, 106-2, and 106-n (collectively "106"), respectively. The secure elements 106a may be communicatively coupled to one or more processors and one or more memories.

The secure elements 106a may include security domains, code, applets, and packages. The packages may include uninstantiated applets, and may be loaded on a secure element, for example, over-the-air (OTA). Applets on the secure element may be in uninstantiated or instantiated form, and uninstantiated applets may be preloaded on a secure element during manufacture of the secure element. Alternatively, applets may be loaded, for example, OTA after a secure element has been manufactured (e.g., upon delivering the secure element to a user). Applets may be generic or non-generic. Non-generic applets may include couponing and loyalty applets, and/or any applet that is not generic to multiple service providers. That is, a non-generic applet may correspond to a single service provider. Data that may be used and/or associated with a non-generic applet (e.g., offers, coupons) may be stored in the secure element or in memory outside of the secure element (e.g., non-volatile memory of a mobile device).

Generic applets may include applets that, when instantiated, can be used by multiple service providers. For example, a generic applet of a payment network (e.g., MasterCard®) may be instantiated for multiple service providers by a central TSM, and therefore may be used by more than one service provider.

Additionally, uninstantiated applets may be instantiated, and each instance may then be extradited to a corresponding security domain. Instantiation may include personalizing applets by using data corresponding to the entity for which the instance is being generated or data corresponding to an end-user or customer of the service.

For example, multiple instances of an uninstantiated applet may be generated for different entities (e.g., service providers) and each instance may be extradited to a different security domain for use by a different entity.

An applet on a secure element may function pursuant to requirements established by Global Platform, Europay, MasterCard®, Visa® (EMVCo.), MNOs, and payment networks (e.g., MasterCard®, Visa®, Discover®, American Express®). Applets may be, for example, Expresspay™ payWave™, PayPass™, Zip™, and the like.

For example, the SP TSM 103-1 sends a request to the central TSM 102 via the communications network 105, and the central TSM 102 sends a response back to the SP TSM 103-1 via the communications network 105. The SP TSM 103-1 sends a request, intended for the secure element 106a-1, to the central TSM 102 via the communications network 105. In turn, the central TSM 102 sends that request to the secure element 106a-1 via the respective mobile network 104-1.

In an alternative embodiment, a plurality of service providers share one of the SP TSMs 103.

In an additional alternative embodiment, the memory 102b may be a database.

In another alternative embodiment, a plurality of mobile networks communicate with a plurality of SP TSMs.

In the exemplary embodiments described herein, the central TSM 102 functions as a pass-through mechanism for installation and personalization data and manages the re-installation and personalization of a partially personalized service on a secure element.

Process

A. Re-Installing a Service Having Security-Critical Data on a Secure Element

Figure 2:
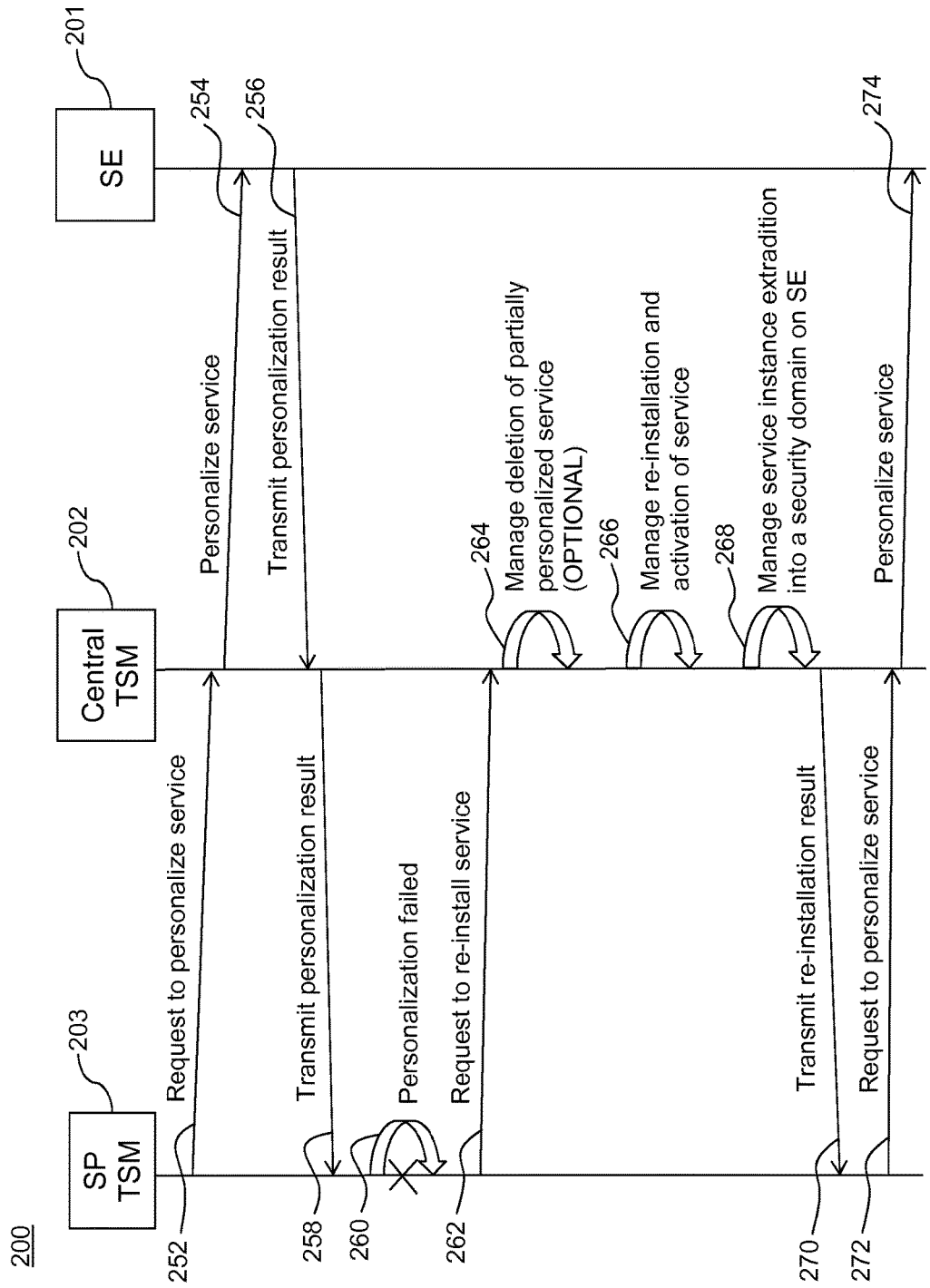
FIG. 2 is a sequence diagram illustrating a sequence for managing a service re-installation request from a service provider trusted service manager to a central trusted service manager according to an exemplary embodiment.

FIG. 2 is a sequence diagram illustrating a sequence for managing a service re-installation request from a SP TSM 203 (e.g., FIG. 1, SP TSM 103-1) to a central TSM 202 (e.g., FIG. 1, central TSM 102), according to an exemplary embodiment. In this example, the service to be re-installed has been partially personalized with security-critical data such as payment and account credentials of a service.

As shown in FIG. 2, at step 252, SP TSM 203 transmits a request to central TSM 202 to personalize a service on SE 201 (e.g., FIG. 1, SE 106a-1). SE 201 includes one or more services installed prior to the personalization request transmitted at step 252. Each service includes at least one applet associated with a corresponding service provider.

The personalization request at step 252 may include one or more of the following attributes: a secure element identifier, a service identifier, and a service qualifier. In addition, the personalization request includes security-critical data such as a credit card account number, an expiration date, and a customer name. A sensitive key used to generate a dynamic cryptogram is also passed at this time.

The secure element identifier is a unique number or set of characters that is written to a secure element and is used (e.g., by central TSM 202) to identify the target secure element. For example, the secure element identifier may be a Card Image Number (CIN), which is written to the secure element during manufacture of the secure element.

The service identifier may include a service identifier number and version of the service, which are used (e.g., by central TSM 202) to identify a target generic service on SE 201.

The service qualifier includes a service provider name and payment account reference number (PRN), and is used (e.g., by central TSM 202) to identify the particular instance of the target service (e.g., the service corresponding to the service identifier) that is to be acted on (e.g., installed, deleted) by using requests, including commands.

At step 254, central TSM 202 identifies the target service and the target secure element using the information in the personalization request received at step 252. In turn, central TSM 202 begins to personalize that service on SE 201 by transmitting one or more commands to SE 201 to deliver the security-critical data received in the personalization request. If the personalization procedure is successfully completed, SE 201 transmits, at step 256, a personalization result to central TSM 202. The personalization result may be in the form of an identifier, referred to as a "status word," that corresponds to a predetermined list of potential results. Status words are described in more detail below in connection with Table 2. For example, as shown in Table 2, if the personalization request was successfully processed and the personalization of the service was successfully completed, central TSM 202 receives a status word from the SE 201 (e.g., status words '90' '00') indicating that success. The central TSM 202 may, in turn, transmit the personalization result to the SP TSM 203, at step 258.

Alternatively, during the personalization of the service on the SE 201 an error may occur (e.g., due to a communication error or a dropped connection) that causes the personalization process of step 254 to fail. As a result, the service is left partially personalized on SE 201, meaning that all of the personalization data was not fully and successfully installed on the service during the personalization process. The personalization procedure failure may be detected by central TSM 202 or by SE 201.

If a personalization error or failure is identified by the central TSM 202, the failure or error is reported to SP TSM 203 by the central TSM 202, at step 258. In particular, central TSM 202 transmits an error notification including a subject code and or reason code indicating that the personalization process of the service was not successful. Examples of errors identified by the central TSM 202 include: a null pointer exception due to an internal error at central TSM 202 or a dropped communication in which a database (e.g., in SP TSM 203) went offline and the central TSM 202 could not communicate with the database. Examples of errors identified by central TSM 202, including subject codes and reason codes are described in more detail below in Table 1. Typically, a description and instruction correspond to a subject code and reason code of an error. The description is an explanation of why the error occurred during the personalization process, and the instruction is a suggested step or steps to take with regard to the installation of the service being personalized.

TABLE 1

| Subject Code | Reason Code | Description | Instruction |
| --- | --- | --- | --- |
| 1.2 | 5 | OTA transport error | Re-installation of service should not be initiated |
| 2.6 | 5 | Failure in sending scripts | Re-installation of service should be initiated Note: Take into consideration SCP02 counter may increment |

If a personalization error or failure is identified by the SE 201, the failure or error is reported to the central TSM 202 at step 256, which in turn transmits the failure or error to the SP TSM 203 at step 258. In particular, SE 201 transmits an error notification including a status word or status code indicating that the personalization process of the service was not successful at step 256. Examples of errors identified by the SE 201 include: incorrect data sent to the SE, SE out of memory, or an internal error occurred on the SE. Examples of errors identified by SE 201, including status words (SWs) are described in more detail below in Table 2. Typically, a status word of an error includes a description of the error and a corresponding instruction as to what step should or should not be initiated. The description is an explanation of why the error occurred during the personalization process, and the instruction is a suggested step or steps to take with regard to the installation of the service being personalized.

TABLE 2

| SW1 | SW2 | Description | Instruction |
| --- | --- | --- | --- |
| '65' | '81' | Memory failure | Re-installation of service should not be initiated |
| '6A' | '80' | Incorrect parameters in data field | Re-installation of service should be initiated Note: Parameter(s) in data fields (i.e., data in the personalization request) shall be properly rebuilt before new personalization script is sent Take into consideration SCP02 counter may increment |
| '6A' | '84' | Not enough memory space | Re-installation of service should not be initiated |
| '6A' | '88' | Referenced data not found | Re-installation of service should be initiated Note: Referenced data (i.e., data in the personalization request) shall be properly set before new personalization script is sent Take into consideration SCP02 counter may increment |
| '6A' | '80' | Incorrect values in command data | Re-installation of service should be initiated Note: Command data (i.e., data in the personalization request) shall be properly set before new personalization script is sent Take into consideration SCP02 counter may increment |
| '64' | '00' | No specific diagnoses | Re-installation of service should be initiated |
| '67' | '00' | Wrong length in Lc | Re-installation of service should be initiated Note: Lc value and data length must correspond to each other before new personalization script is sent Take into consideration SCP02 counter may increment |

TABLE 2-continued

| SW1 | SW2 | Description | Instruction |
|---|---|---|---|
| '69' | '85' | Condition of use not satisfied | Re-installation of service should be initiated<br>Note:<br>Take into consideration SCP02 counter may increment |
| '6A' | '86' | Incorrect P1 P2 | Re-installation of service should be initiated<br>Note:<br>P1 P2 shall be properly set before new personalization script is sent<br>Take into consideration SCP02 counter may increment |
| '90' | '00' | A successful execution of the APDU (application protocol data unit) | Re-installation of service should be initiated when the number of the response APDUs are not equal to the number of the command APDUs<br>Note:<br>Take into consideration SCP02 counter may increment |

At step 260, using the personalization result information transmitted to it by central TSM 202, SP TSM 203 determines that the personalization requested at step 252 has failed. SP TSM 203 can then take any action it deems necessary including, for example, requesting the re-installation of the service which was partially personalized.

Due to the nature of security-critical data, once personalization has begun, the personalization is to be completed in sequence and without a connection drop in order to assure the same security context according to the design requirements of certain security-critical applets (e.g., payment applets). For example, in order to prevent fraud (e.g., if authentication keys are breached), sensitive payment or account credentials of a service that are already on the secure element may not be overwritten or appended without requiring steps 264-270 of FIG. 2 to be performed. Indeed, most payment applets do not allow an audit to identify what data may have been written to the secure element during a personalization attempt. Therefore, the partially personalized service is re-installed and then personalized, rather than having the previously installed service re-personalized.

At step 262, in order to re-install the service, SP TSM 203 transmits, over the network, a re-installation request to central TSM 202 to re-install the service that was partially personalized. The re-installation request may include one or more of the following attributes that identifies the service to be re-installed: a secure element identifier, service identifier, and service qualifier.

In one example embodiment, if a personalization process of a service has failed, the service is deleted prior to being re-installed.

At step 264, the central TSM 202 (e.g., via an API) manages the deletion of the partially personalized service on the SE 201 by transmitting one or more commands to the SE 201. In other example embodiments, the service does not have to be deleted prior to being re-installed on the SE 201. Instead, the service may be overwritten by the re-installation of the service.

At step 266, central TSM 202 (e.g., via the API) manages re-installation of the service (e.g., instantiates a new instance of the service on SE 201 and notifies SP TSM 203 that the new instance is available for a recovery attempt to re-install the service) and activation of the service (e.g., made usable or selectable). Activating a service includes activating the service of a service provider and making the applets associated with that service selectable on a particular secure element. As described above, the service identifier and service qualifier are used to identify the general and particular instance of the service to be activated on the secure element.

At step 268, central TSM 202 (e.g., via the API) manages service instance extradition (e.g., extradites the instantiated instance of the service) into a corresponding security domain on SE 201.

Service deletion, activation, and extradition are described in U.S. patent application Ser. No. 13/653,145 entitled "Systems, Methods, and Computer Program Products for Managing Secure Elements," which is hereby incorporated by reference in its entirety. In particular, service deletion, activation and extradition are performed by the central TSM transmitting commands (e.g., APDU commands) to a target secure element on a mobile device.

When the re-installation has been completed (e.g., service deleted, re-installed, instantiated, activated and extradited) the central TSM 202, at step 270, transmits a response, over the network, to the SP TSM 203, including information indicating the result (e.g., success, failure) of the re-installation requested by the SP TSM 203 at step 262.

At step 272, the SP TSM 203 transmits a request to the central TSM 202 to personalize the service re-installed on the SE 201. The request may include one or more of a secure element identifier, service identifier, and service qualifier, as well as security-critical data. In turn, at step 274, the central TSM 202 personalizes the SE 201. Service personalization, described above, is performed by the central TSM 202 transmitting one or more commands to the SE 201 to add and/or install data including security-critical data.

In an alternative embodiment, service re-installation may also include performing a technical eligibility check (e.g., TSM eligibility check) or a business eligibility check (e.g., MNO eligibility check). Exemplary technical eligibility checks and business eligibility checks are described in more detail in U.S. patent application Ser. No. 13/848,962 entitled "Systems, Methods, and Computer Program Products for Provisioning Payment Accounts into Mobile Wallets and Managing Events," which is hereby incorporated by reference in its entirety. For example, a technical eligibility check may be used to determine whether SE 201 has sufficient memory space to have data installed on it and a business eligibility check may include validating a mobile directory number associated with a secure element identified in an service installation request.

B. Re-Installing a Service Having Non-Security-Critical Data on a Secure Element In another exemplary embodiment, a service to be re-installed does not include security-critical data. Such services may include, for example, a transit pass service or a ticketing service. In such an exemplary embodiment, if data (e.g., transit passes, movie tickets) is partially personalized or installed on a service in a SE due to a failure or error as described above, that data may be re-personalized or re-installed starting from the point at which the failure or error occurred. That is, to complete a personalization process, the service need not be deleted. Instead, the data to be re-personalized or re-installed is the data that was not successfully personalized or installed. In addition, a clean-up (e.g., deletion and re-instantiation of the service) is not required.

In FIG. 2, if personalization fails (e.g., due to a communication error or a dropped connection) for a service having non-security-critical data, SP TSM 203 can retry and send the same data again at step 262. Personalization data that is already on the service on SE 201 can be overwritten or appended without requiring steps 264-270 of FIG. 2 to be performed.

C. Re-Installing Data on a Secure Element

In another exemplary embodiment, the request at step 262 of FIG. 2 may include a re-installation request for data other than services. That is, if personalization or installation of data on a secure element is not successfully performed, the SP TSM can transmit a re-installation request to the central TSM. In turn, the central TSM can attempt to re-install the unsuccessfully installed data on the secure element.

D. Processing States of the Service in the Central TSM During Re-Installation

Figure 3:
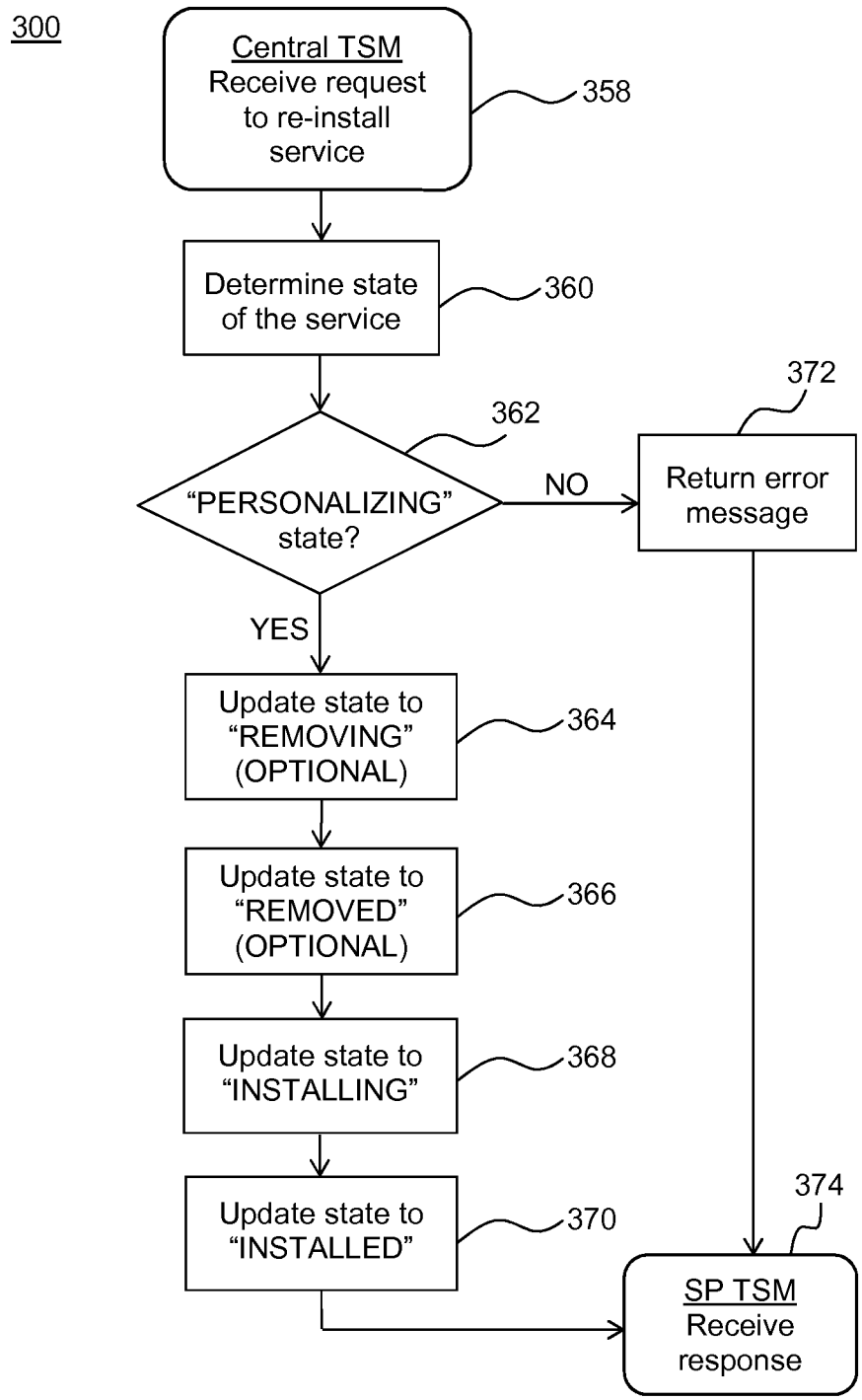
FIG. 3 is a flow chart illustrating a sequence of processing states of a service in the central TSM during re-installation of a service according to an exemplary embodiment.

FIG. 3 is a flow chart illustrating a sequence of processing states of a service in a central TSM during service re-installation according to an exemplary embodiment. Exemplary states of the service include: "PERSONALIZING," "REMOVING," "REMOVED," "INSTALLING," and "INSTALLED."

Referring to both FIGS. 2 and 3, the states are managed and monitored by central TSM 202 during the re-installation process. In particular, management of a state includes central TSM 202 storing in its memory a state corresponding to a service being re-installed on the SE 201 by the central TSM 202.

At block 358, a service provider communicates with a central TSM 202 to request re-installation of a service on SE 201. Upon receiving the request, at block 360, the central TSM 202 determines the state of the service to be re-installed. The central TSM 202 performs re-installation of a service when the state of the service in the central TSM 202 is "PERSONALIZING."

A service is in "PERSONALIZING" state when the personalization process of the service fails. That is, the "PERSONALIZING" state indicates that personalization has been initiated but has not been completed (e.g., communication dropped or an error occurred).

If central TSM 202 determines at block 362 that the state of the service is "PERSONALIZING," the central TSM 202 updates the state of the service to "REMOVING," at block 364, during the service deletion step 262 and updates the state of the service to "REMOVED," at block 366, when the deletion step is completed.

If central TSM 202 determines that the service state is "PERSONALIZING," at block 362, the central TSM 202 implements the re-installation request, at step 262, and updates the state of the service to "INSTALLING," at block 368, to indicate that the service is being re-installed.

If central TSM 202 determines that the service state is other than "PERSONALIZING," at block 362, an error message (e.g., "Operation Not Allowed") is returned by central TSM 202 to SP TSM 203, at block 372.

Upon completion of service re-installation and activation, the state of the service is updated to "INSTALLED," at block 370, to indicate that the re-installation procedure is complete.

Central TSM 202 transmits a response, over the network, to SP TSM 203, at block 374, including a result of processing the re-installation request (e.g., re-installation success or failure).

E. Counter Reset Policy

Figure 4:
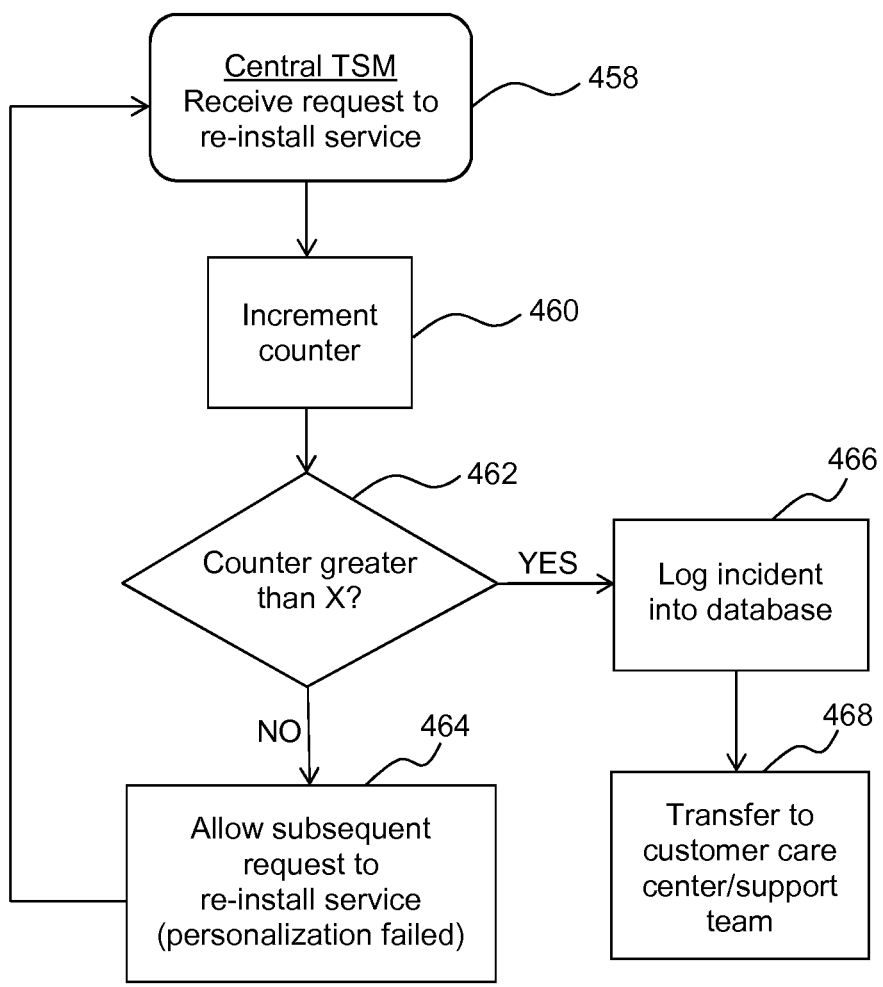
FIG. 4 is a flow chart illustrating a counter reset policy of the re-installation procedure according to an exemplary embodiment.

FIG. 4 is a flow chart illustrating a counter reset policy of the re-installation procedure according to an exemplary embodiment.

As shown in FIG. 4, a counter (e.g., Global Platform Secure Channel Protocol '02' (SCP02) counter) counts a number of re-installation requests from the network. The counter is included in central TSM 202 of FIG. 2. Referring to both FIGS. 2 and 4, when central TSM 202 receives a re-installation request, at step 262 of FIG. 2 or block 458 of FIG. 4, to re-install a service at least partially personalized on a secure element, the counter is incremented, at block 460.

To avoid infinite loops, central TSM 202 implements a counter reset policy, at block 462, such that the number of re-installation requests is limited to a predetermined number (e.g., three) of re-installation attempts. That predetermined number is shown as variable "X" in block 462.

Subsequent attempts (e.g., re-installation requests) received by central TSM 202 from SP TSM 203 to re-install a service are allowed up until the maximum number of re-installation requests has been reached, at block 464.

After a last allowed unsuccessful re-installation attempt, further attempts are prohibited by the central TSM 202. The incident (e.g., that the service was unsuccessfully attempted to be re-installed the maximum number of times) may be logged into a database in central TSM 202 and an investigation is initiated, at block 466. A message may be communicated to a mobile device containing the SE 201, which in turn is displayed or otherwise communicated through the mobile device and ultimately to a user of the mobile device through a user interface such as a display or audio system. The mobile device can then be used to route the user to a customer care center associated with the central TSM 202 at block 468, where a customer representative may assist in troubleshooting the error.

F. Computer Readable Medium Implementation

The present invention (e.g., system 100, sequence 200, flowcharts 300 and 400, or any part(s) or function(s) thereof) can be implemented by using hardware, software, or a combination thereof, and can be implemented in one or more mobile device or other processing systems. To the extent that manipulations performed by the present invention were referred to in terms of human operation, no such capability of a human operator is necessary, or desirable in most cases, in any of the operations described herein which form part of the present invention. Rather, the operations described herein are machine operations. Useful machines for performing the operations of the present invention include mobile phones, smartphones, personal digital assistants (PDAs) or similar devices.

Figure 5:
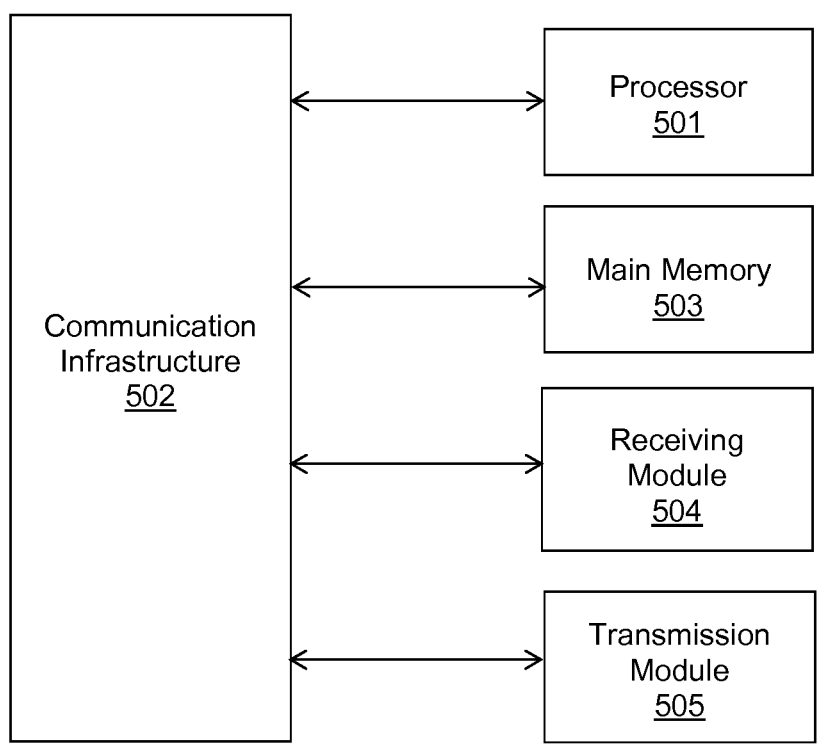
FIG. 5 is a block diagram of an exemplary system useful for implementing the present invention.

In one embodiment, the invention is directed toward one or more systems capable of carrying out the functionality described herein. An example of a system 500 is shown in FIG. 5.

The system 500 includes one or more processors, such as processor 501. The processor 500 is coupled to a communication infrastructure 502 (e.g., communication bus, network). Various embodiments are described in terms of this exemplary system. After reading this description, it will become more apparent to a person skilled in the relevant arts) how to implement the invention by using other systems and/or architectures.

The system 500 also includes a main memory 503, which may be a database, or the like.

The system 500 also includes a receiving module 504 for receiving data, such as requests (e.g., to install and re-install data), from other entities over a network. Receiving data, such as requests, is described in further detail above with reference to FIGS. 2-4.

The system 500 also includes a transmission module 505 for transmitting data, such as requests and responses, to other entities over a network. Transmitting data, such as requests and responses, is described in further detail above with reference to FIGS. 2-4.

Each of modules 504 and 505 may be implemented by using hardware, software or a combination of the two.

The example embodiments described above such as, for example, the systems and procedures depicted in or described in connection with FIGS. 1 to 4, or any part or function thereof, may be implemented by using hardware, software or a combination of the two. The implementation may be in one or more computers or other processing systems. While manipulations performed by these example embodiments may have been referred to in terms commonly associated with mental operations performed by a human operator, no human operator is needed to perform any of the operations described herein. In other words, the operations may be completely implemented with machine operations. Useful machines for performing the operation of the example embodiments presented herein include general purpose digital computers or similar devices.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a non-transitory storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD or CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the non-transitory computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applets. Ultimately, such computer readable media further includes software for performing example aspects of the invention, as described above.

Included in the programming and/or software of the general and/or special purpose computer or microprocessor are software modules for implementing the procedures described above.

While various example embodiments of the invention have been described above, it should be understood that they have been presented by way of example, and not limitation. It is apparent to persons skilled in the relevant art(s) that various changes in form and detail can be made therein. Thus, the disclosure should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A system to manage data re-installation, comprising:
a memory;
a processor communicatively coupled to the memory, the processor being operable to execute computer-executable program instructions stored in the memory to cause the system to:
receive, by a central trusted service manager (central TSM) from a particular one of a plurality of service provider trusted service managers (service provider TSMs) over a network, a re-install request to re-install data at least partially installed on a secure element of a user computing device;
re-install, by the central TSM over the network, the data on the secure element of the user computing device, wherein the re-installed data comprises an uninstantiated service;
instantiate, by the central TSM over the network, the reinstalled data to create an instantiated service accessible by the particular one of the service provider TSMs;
extradite, by the central TSM, the instantiated data comprising the instantiated service on the secure element into a security domain on the secure element of the user computing device, the security domain comprising data that are accessible by the particular one of the service provider TSMs over the network; and
activate, by the central TSM over the network, the instantiated data comprising the instantiated service that has been extradited to the security domain on the secure element of the user computing device so that the data comprising the instantiated service is usable by the user computing device.

2. The system of claim 1, the processor being further operable to execute computer-executable program instructions stored in the memory to cause the system to delete the data at least partially installed on the secure element.

3. The system of claim 2, the processor being further operable to execute computer-executable program instructions stored in the memory to cause the system to delete the data at least partially installed on the secure element prior to performing the re-installation.

4. The system of claim 1, wherein the re-install request comprises a secure element identifier, a service identifier, and a service qualifier.

5. The system of claim 1, the processor being further operable to execute computer-executable program instructions stored in the memory to cause the system to transmit a response over the network including a result of processing the re-install request.

6. The system of claim 1, the memory being operable to store a state of the data, and the processor being further operable to execute computer-executable program instructions stored in the memory to cause the system to:
   determine, upon receiving the re-install request, the state of the data;
   update the state of the data to indicate the data is being installed on the secure element when it is determined that the state of the data is personalizing; and
   return an error message over the network when it is determined that the state of the data is other than personalizing.

7. The system of claim 6, the processor being further operable to execute computer-executable program instructions stored in the memory to cause the system to update the state of the data to indicate that the data is being deleted from the secure element when it is determined that the state of the data is personalizing.

8. The system of claim 1, the processor being further operable to execute computer-executable program instructions stored in the memory to cause the system to perform a technical eligibility check and a business eligibility check prior to reinstalling the data on the secure element of the user computing device.

9. The system of claim 1, the processor being further operable to execute computer-executable program instructions stored in the memory to cause the system to count a number of re-install requests from the network, wherein the number of re-install requests is limited to a predetermined number.

10. A computer-implemented method to manage data re-installation, comprising:
   receiving, using one or more computing devices associated with a central trusted service manager (central TSM) from a particular one of a plurality of service provider (SP) trusted service managers (TSM) over a network, a re-install request to re-install data at least partially installed on a secure element of a user computing device;
   re-installing, over the network and using the one or more computing devices, the data on the secure element of the user computing device, wherein the re-installed data comprises an uninstantiated service;
   instantiating, using the one or more computing devices, over the network, the reinstalled data to create an instantiated service accessible by the particular one of the service provider TSMs;
   extraditing, using the one or more computing devices, the instantiated data comprising the instantiated service on the secure element into a security domain on the secure element of the user computing device, the security domain comprising data that are accessible by the particular one of the plurality of service provider trusted service managers over the network; and
   activating, over the network, using the one or more computing devices, the data re-installed on the secure element of the user computing device so that the data is usable by the user computing device.

11. The computer-implemented method of claim 10, wherein the data comprises a service.

12. The computer-implemented method of claim 10, further comprising deleting, over the network and using the one or more computing devices, the data at least partially installed on the secure element.

13. The computer-implemented method of claim 12, wherein the deleting the data at least partially installed on the secure element occurs prior to re-installing the data on the secure element.

14. The computer-implemented method of claim 10, wherein the re-install request comprises a secure element identifier, a service identifier, and a service qualifier.

15. The method of claim 10, further comprising transmitting, using the one or more computing devices, a response over the network including a result of processing the re-install request.

16. The method of claim 10, further comprising:
   determining, using the one or more computing devices and upon receiving the re-install request, the state of the data;
   updating, using the one or more computing devices, the state of the data to indicate the data is being installed on the secure element when it is determined that the state of the data is personalizing; and
   returning, using the one or more computing devices an error message over the network when it is determined that the state of the data is other than personalizing.

17. The method of claim 16, further comprising updating, using the one or more computing devices, the state of the data to indicate that the data is being deleted from the secure element when it is determined that the state of the data is personalizing.

18. The method of claim 10, further comprising performing, using the one or more computing devices, a technical eligibility check and a business eligibility check prior to reinstalling the data on the secure element of the user computing device.

19. The method of claim 10, further comprising counting, using the one or more computing devices, a number of re-install requests from the network, wherein the number of re-install requests is limited to a predetermined number.

20. A computer program product comprising a non-transitory computer-readable medium having computer-executable program instructions embodied thereon that when executed by a computer cause the computer to
   receive, by a central trusted service manager (central TSM) from a particular one of a plurality of service provider (SP) trusted service managers (TSMs) over a network, a re-install request to re-install a data at least partially installed on a secure element of a user computing device;
   re-install, by the central TSM over the network, the data on the secure element of the user computing device, wherein the reinstalled data comprises an uninstantiated service;
   instantiate, by the central TSM over the network, the reinstalled data to create an instantiated service accessible by the particular one of the service provider TSMs;
   extradite, by the central TSM, the data re-installed on the secure element into a security domain on the secure element of the user computing device, the security domain comprising data that are accessible by the particular one of the plurality of service provider trusted service managers; and
   activate, by the central TSM over the network, the data re-installed on the secure element of the user computing device so that the data is usable by the user computing device.

21. The computer program product of claim 20, wherein the data comprises a service.

22. The computer program product of claim 20, wherein the non-transitory computer-readable medium further comprises computer-executable program instructions embodied thereon, that when executed by the computer further cause the computer to delete the data at least partially installed on the secure element.

23. The computer program product of claim 22, wherein the non-transitory computer-readable medium further comprises computer-executable program instructions embodied thereon, that when executed by the computer further cause the computer to delete the data at least partially installed on the secure element prior to performing the re-installation.

24. The computer program product of claim 20, wherein the re-install request comprises a secure element identifier, a service identifier, and a service qualifier.

25. The computer program product of claim 20, wherein the non-transitory computer-readable medium further comprises computer-executable program instructions embodied thereon, that when executed by the computer further cause the computer to transmit a response over the network including a result of processing the re-install request.

26. The computer program product of claim 20, wherein the non-transitory computer-readable medium further comprises computer-executable program instructions embodied thereon, that when executed by the computer further cause the computer to:
 determine, upon receiving the re-install request, the state of the data;
 update the state of the data to indicate the data is being installed on the secure element when it is determined that the state of the data is personalizing; and
 return an error message over the network when it is determined that the state of the data is other than personalizing.

27. The computer program product of claim 26, wherein the non-transitory computer-readable medium further comprises computer-executable program instructions embodied thereon, that when executed by the computer further cause the computer to update the state of the data to indicate that the data is being deleted from the secure element when it is determined that the state of the data is personalizing.

28. The computer program product of claim 20, wherein the non-transitory computer-readable medium further comprises computer-executable program instructions embodied thereon, that when executed by the computer further cause the computer to perform a technical eligibility check and a business eligibility check prior to reinstalling the data on the secure element of the user computing device.

29. The computer program product of claim 20, wherein the non-transitory computer-readable medium further comprises computer-executable program instructions embodied thereon, that when executed by the computer further cause the computer to count a number of re-install requests from the network, wherein the number of re-install requests is limited to a predetermined number.

* * * * *